(12) United States Patent
Farmer et al.

(10) Patent No.: US 7,700,041 B2
(45) Date of Patent: Apr. 20, 2010

(54) INDIRECT DETECTION OF RADIATION SOURCES THROUGH DIRECT DETECTION OF RADIOLYSIS PRODUCTS

(75) Inventors: Joseph C. Farmer, Tracy, CA (US); Larry E. Fischer, Los Gatos, CA (US); Thomas E. Felter, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1174 days.

(21) Appl. No.: 11/292,827

(22) Filed: Dec. 1, 2005

(65) Prior Publication Data

US 2007/0128077 A1     Jun. 7, 2007

(51) Int. Cl.
    *G01N 31/22*  (2006.01)
(52) U.S. Cl. .............................. 422/55; 422/98; 436/57; 436/58
(58) Field of Classification Search ............. 422/55–56, 422/98; 436/57–58
    See application file for complete search history.

(56) References Cited

U.S. PATENT DOCUMENTS

| | | |
|---|---|---|
| 2,708,242 A | 5/1955 | Ruben |
| 2,789,232 A | 4/1957 | Block |
| 3,030,510 A | 4/1962 | Reeder |
| 3,179,581 A | 4/1965 | Lewin et al. |
| 4,937,038 A | 6/1990 | Sakai et al. |
| 5,186,798 A | 2/1993 | Sakai et al. |
| 6,344,818 B1 | 2/2002 | Markov |
| 6,347,132 B1 | 2/2002 | Annis |
| 6,582,657 B2 * | 6/2003 | Warner et al. ................. 422/56 |
| 6,583,425 B1 * | 6/2003 | Warner .................... 250/472.1 |

FOREIGN PATENT DOCUMENTS

DE         004129099    *  3/1993

OTHER PUBLICATIONS

Ramez-Nino J et al: "Design and fabrication of an optical dosimeter for UV and gamma irradiation" Radiation Measurements, Elsevier, Amsterdam, NL, vol. 30, No. 2, Apr. 1, 1999, pp. 181-187, XP004168691 ISSN: 1350-4487, abstract, p. 182, left-hand column, paragraph 2, p. 184, right-hand column, paragraph 3—paragraph 4, figure 1.

Sasse R.: "Gamma and neutron radiolysis of the system trichlorothylene-oxygen-water" Health Physics, vol. 13, 1967, pp. 1015-1024, XP002479810 Northern Ireland abstract p. 1017, left-hand column figure 1; table 2.

Namba H. et al: "Oxygen gas dosimeter for flow systems" Appl Radiat Isot, vol. 41, No. 1, 1989, pp. 53-56, XP002479590 the whole document.

* cited by examiner

*Primary Examiner*—Lyle A Alexander
(74) *Attorney, Agent, or Firm*—Eddie E. Scott; John H. Lee

(57) ABSTRACT

A system for indirectly detecting a radiation source by directly detecting radiolytic products. The radiation source emits radiation and the radiation produces the radiolytic products. A fluid is positioned to receive the radiation from the radiation source. When the fluid is irradiated, radiolytic products are produced. By directly detecting the radiolytic products, the radiation source is detected.

12 Claims, 5 Drawing Sheets

INDIRECT DETECTION OF RADIATION SOURCES THROUGH DIRECT DETECTION OF RADIOLYSIS PRODUCTS

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to radiation detection and more particularly to indirect detection of radiation sources through direct detection of radiolysis products.

2. State of Technology

U.S. Pat. No. 6,344,818 to Yuri Markov Feb. 5, 2002 for apparatus and method for the detection of materials provides the following state of technology information, "The ability to detect the presence of a material in any location is a requirement in many disciplines and industries. Determining if a particular material in large or small quantities is present at any location is a concern in medicine, research, exploration forensics, security, law enforcement, and for safety reasons. For example, at points of entry for national borders, and at some complexes, and buildings it can be necessary that contents of baggage and boxes and other such cargo containers be identifiable by inspection or detection methods when searching for contraband such as narcotics, stolen goods, unauthorized medicines and plants explosives and accelerants, liquids, chemicals, and other materials."

U.S. Pat. No. 6,347,132 to Martin Annis issued Feb. 12, 2002 for an x-ray inspection system for automatically detecting nuclear weapons materials provides the following state of technology information, "The detection of contraband (e.g., explosives and drugs) in closed containers is of growing importance worldwide. World events have necessitated tighter screening requirements for the contents of containers placed on aircraft to detect the presence of explosives. In addition, to combat the illegal flow of narcotics across national borders, the contents of containers, such as loaded trucks and vehicles must be inspected to check for the presence of narcotics. High energy x-ray inspection systems remain one of the only technologies capable of inspecting loaded cargo containers and vehicles. There is also a need to inspect containers for nuclear grade weapons' materials. There is a growing concern that some of these materials may come into possession of terrorists, due to the relatively large volume of nuclear weapons grade materials stored worldwide. Detectors such as Geiger counters and gamma ray detectors are well known for detecting nuclear weapons materials. However, since Uranium does not emit a significant flux of gamma rays, it can not be detected by a gamma ray detector (e.g., a gamma ray detector mounted outside of the truck which contains the contraband)."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

In a press release, Jun. 27, 2002, U.S. Senators Chuck Schumer (D-NY) and John Warner (R-VA) announced the introduction of the Anti Nuclear Terrorism Act of 2002. The legislation would provide desperately needed federal money to fund the research and development of sophisticated technology to detect nuclear devices which may be smuggled into U.S. ports and across the nation's borders. The bill's passage would mean stricter cargo reporting standards, increased penalties for unreported cargo, more manual inspections of cargo and merchandise, the purchase of over 100 new mobile X-ray scanning devices, and over $250 million to develop new technology to detect nuclear materials.

Schumer and Warner discussed the risk of terrorists successfully placing a nuclear weapon onto a ship or a truck, and outlined the dire need for new technology to detect nuclear devices. Currently, weak inspection standards and poor detection technology means a terrorist group in possession of a nuclear device stands a decent chance of success at attempting to load the device onto a ship or a truck and bring that device directly into the city through the ports or through the city's bridges and tunnels.

"The idea of a truck containing a nuclear device in the center of our center is terrifying, but not impossible. It doesn't matter how good our airport security is if all it takes to bring a nuclear device right into midtown is putting it on a ship or bringing it in on a truck," Schumer said. "Right now, our ability to detect nuclear weapons brought in through our ports, bridges and tunnels is virtually zero. Once terrorists can get that kind of weapon right into the heart of our cities, God only knows what could happen. The longer it takes to put new detection technology at our ports and toll booths, the longer it takes to institute better inspection procedures, standards and techniques, and new Customs agents in place, the greater the risk. And this is not a risk any of us can afford to take."

"Homeland security is the nation's top priority, and defending our nation's 361 ports is essential," declared Warner. "Across the country we handle over 2 billion tons of domestic and international freight, and the majority of that is moved in containers. New York and Virginia handle a tremendous percentage of that freight and the fact is not more than 2 percent of it is inspected. With this legislation we plan to change that."

The University of California has operated the Lawrence Livermore National Laboratory continuously since the laboratory's inception in 1952 and the Laboratory draws on $50^+$years of experience in all aspects of nuclear weapons to address the challenge of nuclear nonproliferation by rogue nations or terrorist groups. Because the materials required for nuclear weapons do not occur naturally, the best way to prevent nuclear proliferation or terrorism is to protect and control nuclear materials. This requires the latest technology in radiation detection.

The present invention provides a system for indirectly detecting a radiation source by directly detecting radiolytic products. The radiation source emits radiation and the radiation produces the radiolytic products. In the present invention a fluid is positioned to receive the radiation from the radiation source. When the fluid is irradiated, radiolytic products are produced. By directly detecting the radiolytic products, the radiation source is detected.

Embodiments of the present invention provide apparatus for the indirect detection a radiation source wherein the radiation source emits radiation. One embodiment comprises an enclosure, a fluid in the enclosure that receives the radiation from the radiation source and produces radiolytic products, and a detector for detecting the radiolytic products thereby indirectly detecting the radiation source.

In one embodiment the fluid is moisture. In one embodiment the fluid is water. In one embodiment the fluid is a gas. In one embodiment the fluid is air. In one embodiment the radiolytic products include $H_2O_2$. In one embodiment the radiolytic products include NO. In one embodiment the radiolytic products include $O_3$. In one embodiment a moisture condenser is positioned proximate the detector. One embodiment includes a thermal-electrical refrigeration moisture condenser positioned proximate the detector. One embodiment includes at least one sensing electrode. In one embodiment the radiolytic products include $H_2O_2$ and the detector includes at least one sensing electrode that detest the $H_2O_2$ using the redox process. In one embodiment the detector is an optical detection device that detects the radiolytic products.

The present invention has use wherever there is a need to detect for radiation. For example, the present invention has use as a system for screening cargo shipments at U.S. government installations, foreign U.S. government or military installations, U.S. ports of entry, foreign ports of origin for cargo shipments to the U.S., and elsewhere. The present invention has use as a system for cargo container inspection at borders, ports, weigh stations used by Highway Patrols, DHS (U.S. Customs, Border Patrol, etc.) container inspections.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
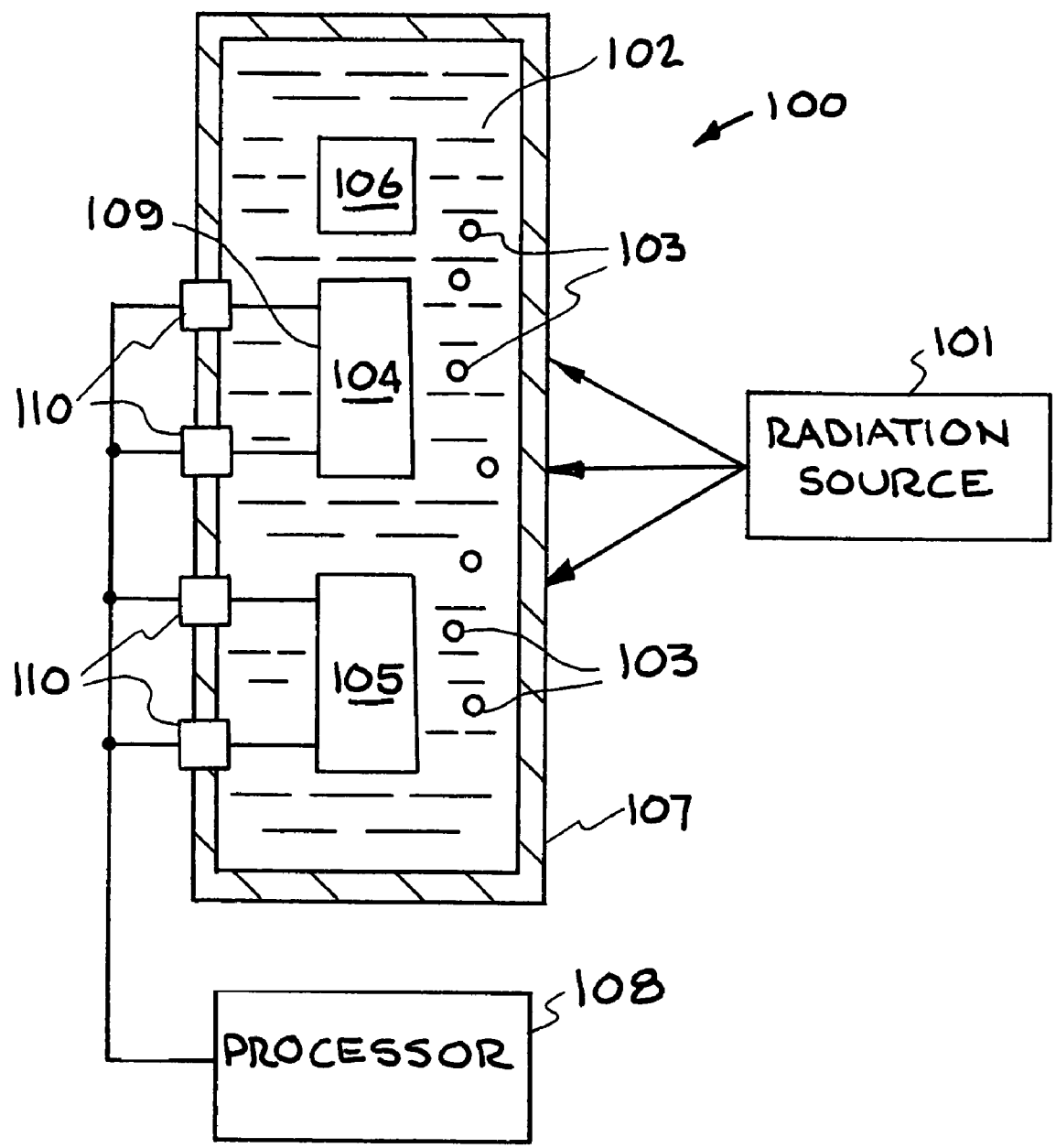
FIG. 1 is an illustration of a system that provides indirect detection of a radiation source through the direct detection of radiolysis products.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides indirect detection of radiation sources through the direct detection of radiolysis products. The interaction of radiation with the material generates radiolytic products. The radiolytic products are detected thereby providing indirect detection of the radiation source.

Referring to the drawings and in particular to FIG. 1, an embodiment of a system of the present invention is illustrated. This embodiment of the system is designated generally by the reference numeral 100. The system 100 provides a system for indirect detection of radiation sources through the direct detection of radiolysis products. The system 100 has use wherever there is a need to detect for radiation. The system 100 has use as a system for detecting radiation in cargo shipments at U.S. government installations, foreign U.S. government or military installations, U.S. ports of entry, foreign ports of origin for cargo shipments to the U.S., and elsewhere. The system 100 can be used as a system for cargo container inspection at borders, ports, weigh stations used by Highway Patrols, DHS (U.S. Customs, Border Patrol, etc.) container inspections.

A significant amount of cargo is shipped into the U.S. in containers. The largest volume of cargo entering the U.S. is through the shipping ports, which receive about 6 million cargo containers each year. For example, the port of Los Angeles/Long Beach is one of the busiest ports in the U.S. and received over three million cargo containers in 2001; approximately half of the total traffic arriving at U.S. ports.

The rate of container arrivals at U.S. ports is expected to increase dramatically over the coming decade. The West Coast ports of Los Angeles/Long Beach, Oakland, and Seattle are currently processing 11,000 containers per day, or 8 per minute on a 24/7 basis. With so many containers and a large volume and mass of cargo in each one it is clear that these containers provide an attractive venue for smuggling illicit material into the U.S., including weapons of mass destruction (WMD). Because successful delivery of just one such weapon can have catastrophic consequences it is essential that all cargo containers entering the U.S. be screened with an extremely high probability of detecting any WMD hidden within. The cost of failure is very high. An OECD report (Maritime Transport Committee, "Security in maritime transport: Risk facators and economic impact," Organization for Economic Co-operation and Development (OECD); Directorate for Science, Technology and Industry, Jul., 2003) estimates that a successful WMD attack would shutdown the entire maritime shipping system for a period up to 10 days and this would produce economic costs in the U.S. alone of up to 58 billion dollars.

The number of cargo containers is sufficiently large that the time available to do an inspection would have to be short, about one minute. Inspecting the millions of cargo containers that enter the U.S. by truck, rail, ship or aircraft is a daunting task.

The system 100 provides indirect detection of the radiation source 101 through the direct detection of radiolysis products. The radiation source 101 could be any radiation source for which detection is desired. An example is the detection of a radiation source in a cargo container at port of entry. A cargo container containing a nuclear weapon or the essential materials for a nuclear weapon or a "dirty bomb" would include a radiation source. The radiation source 101 can be detected indirectly by the system 100 through the direct detection of radiolysis products.

The system 100 includes structural elements that are interconnected and used with systems well known in the art. The system 100 illustrated in FIG. 1 includes an enclosure 107 containing a fluid 102. The fluid 102 receives radiation from the radiation source 101 producing radiolysis products 103. A measuring electrode 104 and an electrode 105 detect the radiolysis products 103. The measuring electrode 104 and an electrode 105 are connected to a processor 108 through electrical connectors 110. By directly detecting the radiolysis products 103, the system 100 indirectly detects the radiation source 101.

A moisture condenser 106 is positioned proximate the measuring electrode 104. The moisture condenser 106 produces a film of liquid 109 around the measuring electrode 104. The moisture condenser 106, for example, can be a thin-film thermoelectric cooler that is used as a moisture condenser, to induce condensation of a thin liquid film on the measuring electrode 104. Radiolysis products 103 produce by the radiation from the radiation source 101 is detected by the processor 108 through the measuring electrode 104.

The system 100 provides the indirect detection of the radiation source 101 through the direct detection of the radiolysis products 103. The radiolysis products 103, for example, can be hydrogen peroxide, nitrogen oxide, or ozone. The radiation source 101 can be any radiation source for which detection is desired. For example, the radiation source 101 could be a source of radiation emanating form a cargo container indicating that the cargo container might be carrying a nuclear weapon, the essential materials for building a nuclear weapon, or materials for a "dirty bomb." The radiation source 101 is detected by the system 100 through the direct detection of the radiolysis products 103.

Figure 2:
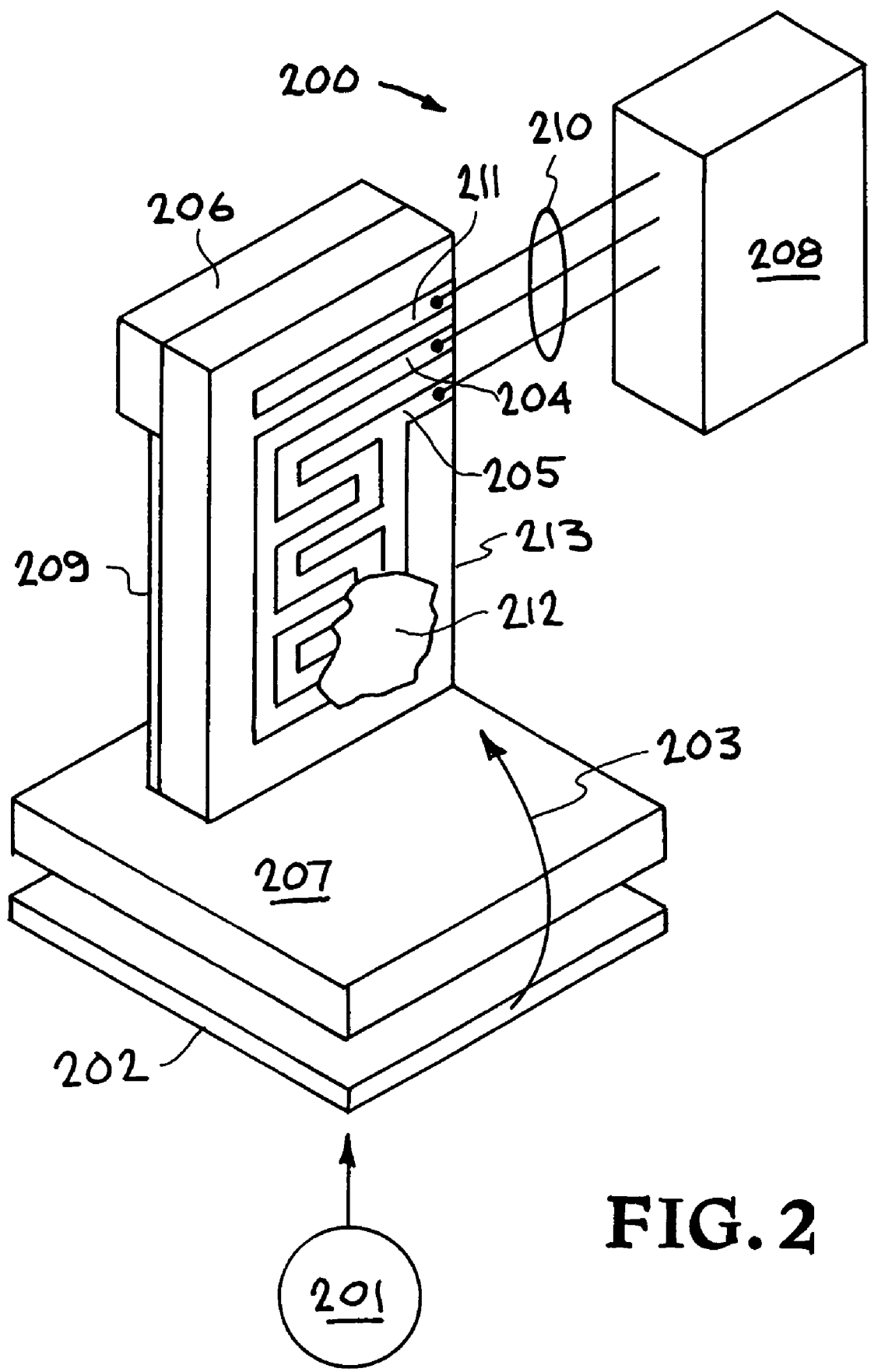
FIG. 2 is an illustration of another system that provides indirect detection of a radiation source through the direct detection of radiolysis products.

Referring now to FIG. 2, another embodiment of the present invention is illustrated. FIG. 2 is a stylized schematic illustration of a radiation detection system that provides indirect detection of radiation sources through the direct detection of radiolysis products. This embodiment of the system is designated generally by the reference numeral 200. The system 200 can be produced through the use of Micro-Electro-Mechanical Systems (MEMS) producing an extremely small radiation detection system. The system 200 produced using Micro-Electro-Mechanical Systems (MEMS) substantially reduces costs for the radiation detection system 200. The system 200 has use wherever there is a need to detect for radiation.

The system 200 includes structural elements that are interconnected as is well known in the art. The system 200 includes structural elements that are used with components well known in the art. The system 200 illustrated in FIG. 2 provides a detector 213 that includes a working electrode (WE) 204, a counter electrode (CE) 205, a reference electrode 211, and an electrolyte 212. The working electrode (WE) 204, counter electrode (CE) 205, and reference electrode 211 are connected to an Alder Potentiostate 208 through electrical connectors 210. Detection systems other than the Alder Potentiostate 208 can be used. The detector 213 is shielded b shielding 207. The detector 213 is produced using Micro-Electro-Mechanical Systems (MEMS) technology and the detector 213 is extremely small and can be produced inexpensively.

A thermoelectric cooler 206 is positioned proximate or as part of the detector 213. The thermoelectric cooler 206 produces a film of liquid 209 along the detector 213. The thermoelectric cooler 206 induces condensation of the thin liquid film 209 on the detector 213. The thermoelectric cooler 206 in one embodiment of the present invention is a thermal-electrical refrigeration cooler.

Radiolysis products 203 produce by the radiation from the radiation source 201 are detected by the detector 213 using the working electrode (WE) 204, the counter electrode (CE) 205, the reference electrode 211, and the Alder Potentiostate 208. The radiolytic products 203 are detected thereby providing indirect detection of the radiation source 201.

The radiolysis products 203, for example, can be hydrogen peroxide, nitrogen oxide, or ozone. In the embodiment of the system 200 illustrated in FIG. 2, the radiation source 201 produces gamma rays γ. The gamma rays γ interact with fluid 202 to produce $H_2O_2$. The $H_2O_2$ is detected by the detector 213.

The radiation source 201 that is to be detected can be any radiation source for which detection is desired. For example, the radiation source 201 could be a source of radiation emanating form a cargo container indicating that the cargo container might be carrying a nuclear weapon, the essential materials for building a nuclear weapon, or materials for a "dirty bomb." The radiation source 201 is detected by the system 200 through the direct detection of the radiolysis products 203.

Figure 3:
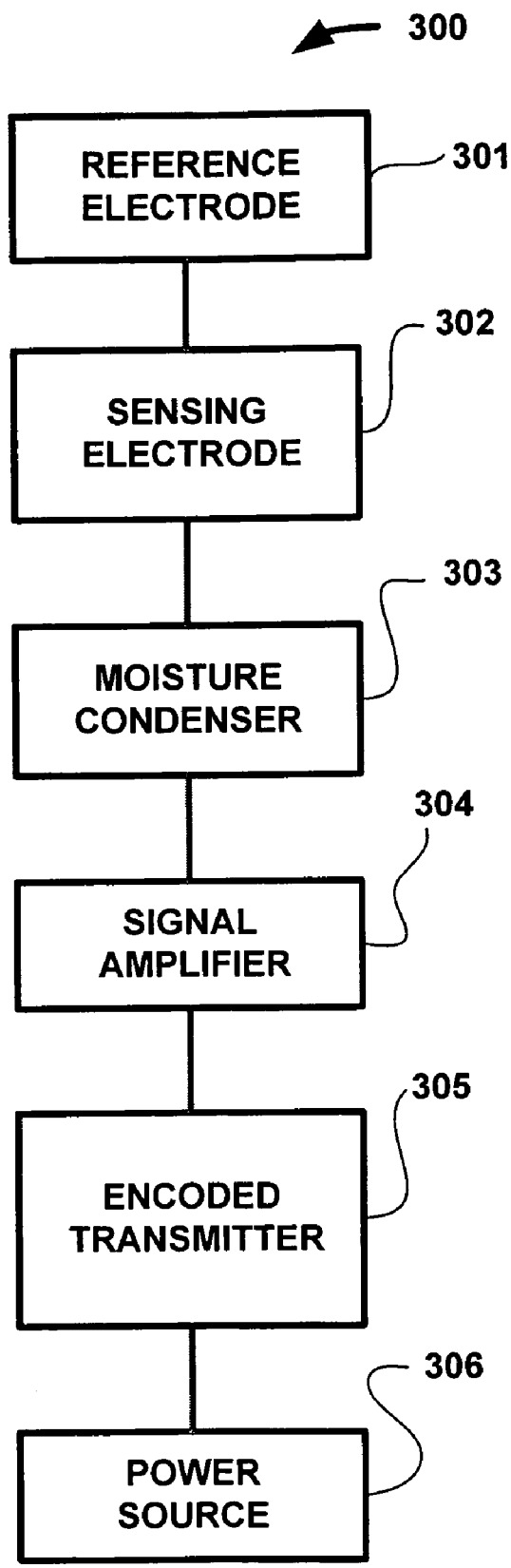
FIG. 3 is a flow chart that illustrates another embodiment of a system that provides indirect detection of a radiation source through the direct detection of radiolysis products.

Referring to FIG. 3, another embodiment of a system of the present invention is illustrated. This embodiment of the system is designated generally by the reference numeral 300. The system 300 provides indirect detection of radiation sources through the direct detection of radiolysis products. The radiation source that is to be detected can be any radiation source for which detection is desired. For example, the radiation source could be a source of radiation emanating form a cargo container indicating that the cargo container might be carrying a nuclear weapon, the essential materials for building a nuclear weapon, or materials for a "dirty bomb." The radiation source is indirectly detected by the system 200 through the direct detection of radiolysis products. The interaction of radiation with the material can generate radiolytic products and the radiolytic products are detected in accordance with the present invention.

The system 300 includes structural elements that are interconnected as is well known in the art. The system 300 includes structural elements that are used with components well known in the art. The system 300 illustrated in FIG. 3 includes a simple reference electrode 301, a sensing electrode 302, a moisture condenser 303, a signal amplifier 304, an encoded transmitter 305, and a maintenance-free power source 306. The system 300 provides the indirect detection of radiation sources in closed spaces, through the direct detection of radiolysis products such as hydrogen peroxide, nitrogen oxide, and ozone While water-containing filler material may shield radiation from direct detection, the interaction of radiation with the water-containing filling material can generate radiolytic products that can be detected. These products can diffuse through holes and non-hermetic barriers to detection modules that can be very simple and inexpensive. A thin-film thermoelectric cooler can be used as the moisture condenser, to induce condensation of a thin water film onto the sensing electrodes. Other types of gas phase sensors can also be employed. For example, laser induced fluorescence can be used for the detection of nitrogen oxides.

The radiation source that is to be detected can be any radiation source for which detection is desired. For example, the radiation source could be a source of radiation emanating form a cargo container indicating that the cargo container might be carrying a nuclear weapon, the essential materials for building a nuclear weapon, or materials for a "dirty bomb." The radiation source is detected by the system 300 through the direct detection of the radiolysis products.

Proof-of-Principal Studies

Applicants conducted proof-of-principal studies. Preliminary calculations were completed for a closed space having a volume of approximately 60,000 liters. In the absence of shielding, a source weighing 1 kilogram, and having an intensity of about 1000 curies per gram, could produce detectable radiolysis products at a rate of about 0.3 ppm per second (1000 ppm per hour). With shielding, this would be lowered to about 200 ppm per hour. A substantially weaker source (10 curies per gram) would still produce about 2-3 ppm per hour, which should also be detectable. Detection will be complicated by heterogeneous catalytic reaction of the products on various solid surfaces near the detector.

Figure 4:
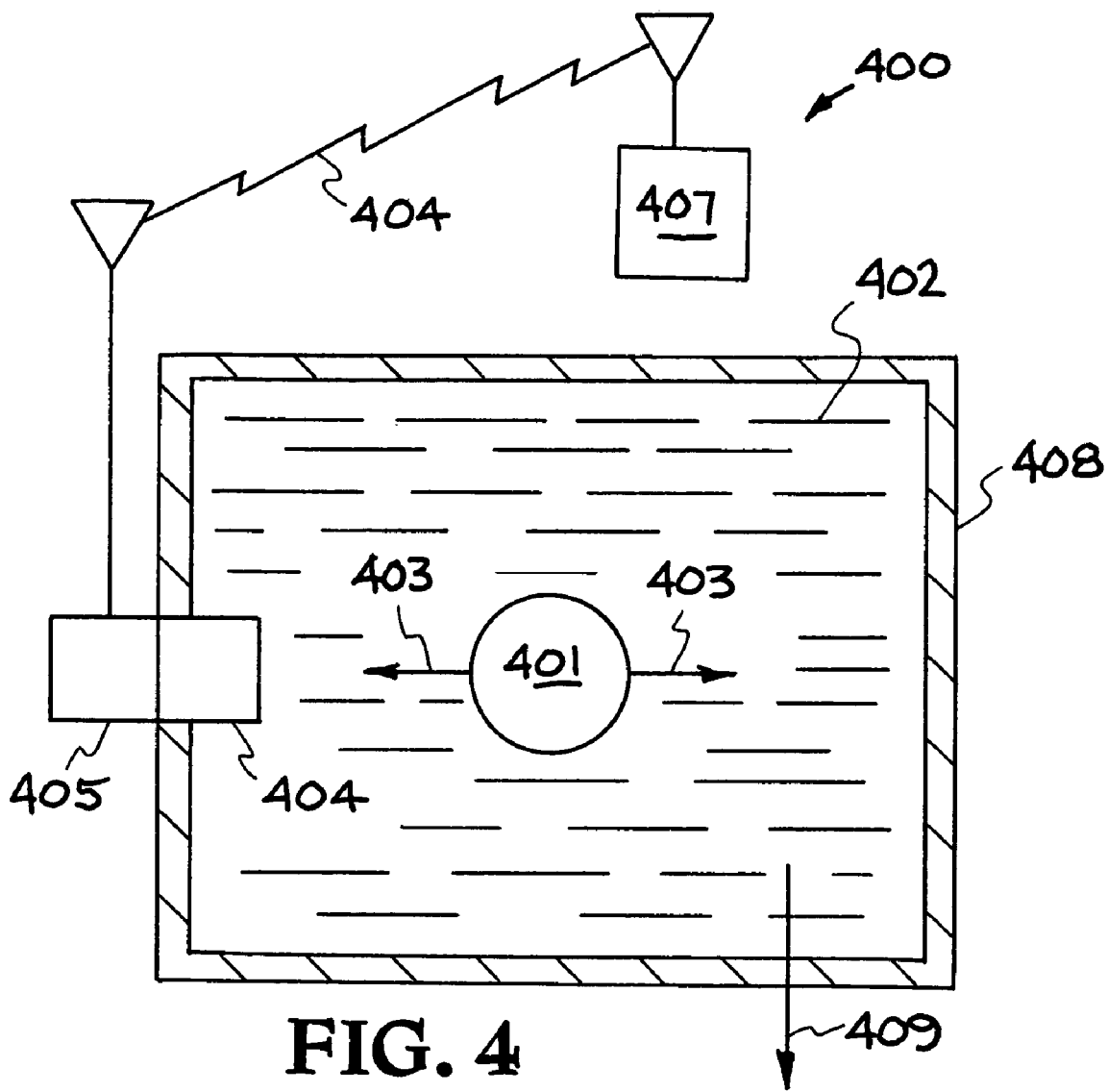
FIG. 4 illustrates a system for proof-of-principal studies of the present invention.

Referring to FIG. 4, a system for proof-of-principal studies of the present invention is illustrated. This system is designated generally by the reference numeral 400. The system 400 illustrates indirect detection of radiation sources through the direct electrochemical detection of radiolysis products. The interaction of radiation with the material can generate radiolytic products, and the radiolytic products are detected in accordance with the present invention.

A radiation source 401 and a fluid 402 are located inside of an enclosure 408. The radiation source 401 produces radiolysis products 403, that undergo electrochemical reduction at (or near) the surface of the sensing electrode (WE). For example, the radiolysis products 403 may be hydrogen peroxide, nitrogen oxide, ozone, or other radiolysis products. There is a possible loss through heterogeneous surface reactions 409.

The presence of the radiolysis products 403 is detected with sensing electrode incorporated in sensor module 404. A wireless battery or thermoelectric powered redox sensor module 405 transmits a signal to a receiver and electronics module 407.

If the sensing electrode is part of a three-electrode electrochemical cell, that also has a reference electrode and a counter electrode, the potential of the sensing electrode can be held at a fixed level relative to the reference electrode potential by a potentio stat circuit. This fixed potential is controlled at a level cathodic (negative) to the rencisible potential required for the electrochemical reduction of the radiolytic product being detected. Under this condition, a current will flow between the sensing electrode and the counter electrode that is proportional to the local concentration of the radiolytic product.

Alternatively, a two-electrode configuration can be used, where the open circuit potential (OCP) of the sensing electrode relative to the potential of the reference electrode is monitored with a sensitive electrometer, connected to the sensing and reference electrodes through a very high impedance. The electrochemical reduction of the radiolytic products by reaction with water will shift the observed OCP in accordance with mixed potential theory. The measured OCP is calibrated in terms of radolytic product concentration, which is dependant upon the dose provided by the source.

Other types of sensors can be employed. For example, laser induced fluorescence can be used for the detection of nitrogen oxides. Another sensor comprises a simple electrochemical oxidation-reduction sensor, capable of measuring hydrogen peroxide, ozone, and nitrogen oxide in thin moisture films. This is can be in the form of a two planar electrodes, one being an Ag/AgCl reference electrode and the other being a platinum-iridium voltage sensing electrode, with a voltage-following amplifier circuit. A simple voltage-controlled oscillator circuit would be used to convert the measured voltage into an easily transmittable signal. Other types of sensors based upon optical detection can also be used.

The system 400 illustrates the principle of indirect detection of a radiation source through the direct detection of the radiolysis products. The radiolysis products, for example, can be hydrogen peroxide, nitrogen oxide, or ozone. The radiation source can be any radiation source for which detection is desired. For example, the radiation source could be a source of radiation emanating form a cargo container indicating that the cargo container might be carrying a nuclear weapon, the essential materials for building a nuclear weapon, or materials for a "dirty bomb." The radiation source is detected by the system through the direct detection of the radiolysis products.

Figure 5:
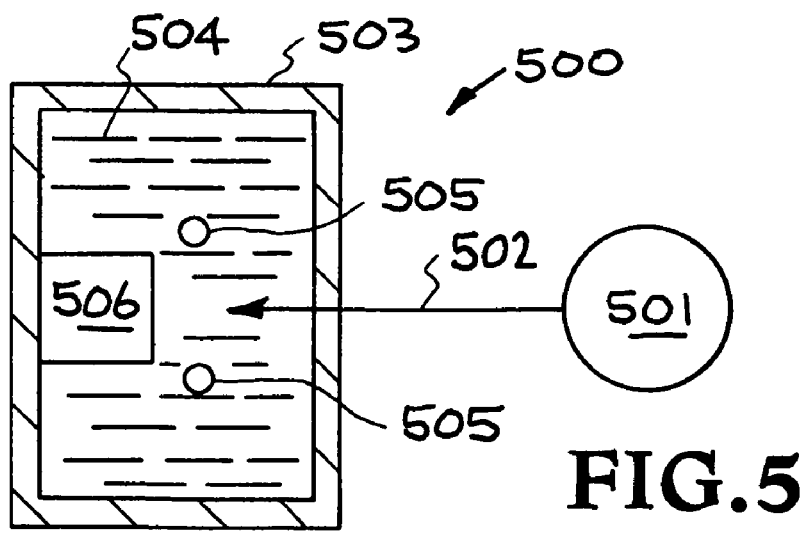
FIG. 5 is an illustration of yet another system that provides indirect detection of a radiation source through the direct detection of radiolysis products.

Referring to FIG. 5, another embodiment of a system of the present invention is illustrated. This embodiment of the system is designated generally by the reference numeral 500. The system 500 provides a system for indirect detection of a radiation source 501 through the direct detection of radiolysis products 505. The system 500 has use wherever there is a need to detect for radiation. For example, the system 500 has use as a system for detecting radiation m cargo shipments at U.S. government installations, foreign U.S. government or military installations, U.S. ports of entry, foreign ports of origin for cargo shipments to the U.S., and elsewhere.

The system 500 illustrated in FIG. 5 includes an enclosure 503 containing a fluid 504. The radiation source 501 emits radiation 502 some of which enters the enclosure 503. The radiation 502 contacts the fluid 504 and produces the radiolysis products 505. A detector 506 detects the radiolytic products 505 thereby indirectly detecting the radiation source 501. In one embodiment the detector includes at least one sensing electrode. In another embodiment the radiolytic products 505 include $H_2O_2$ and the detector 506 includes at least one sensing electrode that detest the $H_2O_2$ using the redox process. In another embodiment the detector 506 is an optical detection device that detects the radiolytic products 505.

The system 500 provides the indirect detection of the radiation source 501 through the direct detection of the radiolysis products 505. The radiolysis products 505, for example, can be hydrogen peroxide, nitrogen oxide, or ozone. The radiation source 501 can be any radiation source for which detection is desired. For example, the radiation source 501 could be a source of radiation emanating form a cargo container indicating that the cargo container might be carrying a nuclear weapon, the essential materials for building a nuclear weapon, or materials for a "dirty bomb." The radiation source 501 is detected by the system 500 through the direct detection of the radiolysis products 505.

Figure 6:
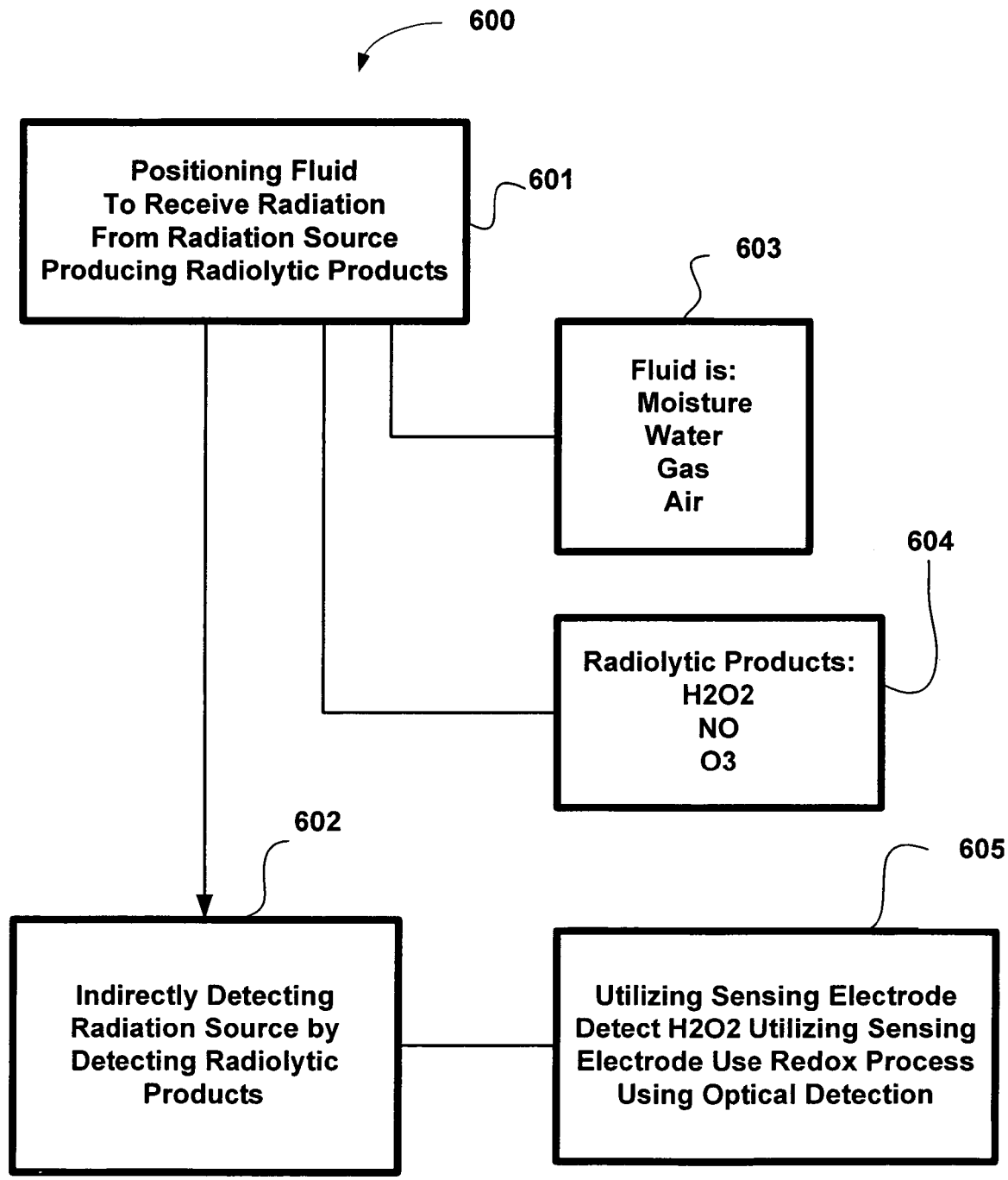
FIG. 6 is a flow chart that illustrates embodiments of methods that provide indirect detection of a radiation source through the direct detection of radiolysis products.

The system of the present invention provides indirect detection of radiation sources through the direct detection of radiolysis products. Referring to FIG. 6, methods of the present invention are illustrated. FIG. 6 is a flow chart that illustrates various method steps of the invention. The methods are designated generally by the reference numeral 600.

The methods 600 provide systems for indirect detection of a radiation source through the direct detection of radiolysis products. The methods 600 have use wherever there is a need to detect for radiation. For example, the methods 600 have use for detecting radiation in cargo shipments at U.S. government installations, foreign U.S. government or military installations, U.S. ports of entry, foreign ports of origin for cargo shipments to the U.S., and elsewhere.

The methods 600 include a number of steps. Step #601 comprises positioning a fluid in a position to receive the radiation from the radiation source producing radiolytic products. Step #2 comprises detecting the radiolytic products thereby indirectly detecting the radiation source. In Step #601, positioning a fluid in a position to receive the radiation from the radiation source producing radiolytic products, the fluid can be moisture or water or gas or air or combinations of moisture, water, gas, or air or other fluids as indicted by the reference numeral 603. In Step #601, positioning a fluid in a position to receive the radiation from the radiation source producing radiolytic products, the radiolytic products can be $H_2O_2$ or NO or $O_3$, or combinations of $H_2O_2$, NO, or $O_3$, or other radiolytic products as indicted by the reference numeral 604.

In Step #602, detecting the radiolytic products thereby indirectly detecting the radiation source, the radiolytic products can be detected by various methods. In Step #602, the radiolytic products can be detected by utilizing a sensing electrode as indicted by the reference numeral 605. In Step #602, the radiolytic products can be detected by detecting $H_2O_2$ utilizing a sensing electrode as indicted by the reference numeral 605. In Step #602, the radiolytic products can be detected by using the Redox Process as indicated by the reference numeral 605.

In Step #602, the radiolytic products can be detected by utilizing optical detection as indicted by the reference numeral 605.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is

1. An apparatus for the indirect detection a radiation source wherein the radiation source emits radiation, comprising:
    an enclosure,
    a fluid in said enclosure that receives the radiation from the radiation source and produces radiolytic products,
    a detector for detecting said radiotytic products thereby indirectly detecting the radiation source, said detector comprising a detector having a sensing electrode, and
    a moisture condenser positioned proximate said detector.

2. The apparatus for the indirect detection a radiation source of claim 1 wherein said fluid is moisture.

3. The apparatus for the indirect detection a radiation source of claim 1 wherein said fluid is water.

4. The apparatus for the indirect detection a radiation source of claim 1 wherein said fluid is a gas.

5. The apparatus for the indirect detection a radiation source of claim 1 wherein said fluid is air.

6. The apparatus for the indirect detection a radiation source of claim 1 wherein said radiolytic products include $H_2O_2$.

7. The apparatus for the indirect detection a radiation source of claim 1 wherein said radiolytic products include NO.

8. The apparatus for the indirect detection a radiation source of claim 1 wherein said radiolytic products include $O_3$.

9. The apparatus for the indirect detection a radiation source of claim 1 wherein said moisture condenser is a thermal-electrical refrigeration moisture condenser positioned proximate said detector.

10. An apparatus for the indirect detection a radiation source wherein the radiation source emits radiation, comprising:
    an enclosure,
    a fluid in said enclosure that receives the radiation from the radiation source and produces radiolytic products, and
    a detector for detecting said radiolytic products thereby indirectly detecting the radiation source
    wherein said detector includes a measuring electrode and a second electrode and said measuring electrode and said second electrode detect said radiolytic products, and a moisture condenser positioned proximate said detector.

11. An apparatus for the indirect detection a radiation source wherein the radiation source emits radiation, comprising:
    an enclosure,
    a fluid in said enclosure that receives the radiation from the radiation source and produces radiolytic products, and
    a detector for detecting said radiolytic products thereby indirectly detecting the radiation source
    wherein said radiolytic products include $H_2O_2$ and wherein said detector includes at least one sensing electrode that detects said $H_2O_2$ using a redox process, and a moisture condenser positioned proximate said detector.

12. An apparatus for the indirect detection a radiation source wherein the radiation source emits radiation, comprising:
    an enclosure,
    a fluid in said enclosure that receives the radiation from the radiation source and produces radiolytic products, and
    a detector for detecting said radiolytic products thereby indirectly detecting the radiation source wherein said detector is an optical detection device that detects said radiolytic products, and a moisture condenser positioned proximate said detector.

* * * * *